United States Patent
Somogyi et al.

(10) Patent No.: US 7,337,188 B2
(45) Date of Patent: Feb. 26, 2008

(54) METHOD AND ASSIGNMENT OF TRANSACTION BRANCHES BY RESOURCE NAME ALIASING

(75) Inventors: Alexander J. Somogyi, Basking Ridge, NJ (US); Fei Luo, Bedmister, NJ (US); Stephen Felts, Denville, NJ (US)

(73) Assignee: BEA Systems, Inc., San Jose, CA (US)

( * ) Notice: Subject to any disclaimer, the term of this patent is extended or adjusted under 35 U.S.C. 154(b) by 203 days.

(21) Appl. No.: 11/247,780

(22) Filed: Oct. 11, 2005

(65) Prior Publication Data

US 2007/0083544 A1   Apr. 12, 2007

(51) Int. Cl.
*G06F 17/30* (2006.01)
(52) U.S. Cl. .................................... 707/102; 707/100

(58) Field of Classification Search ................ 707/10, 707/100, 6, 101, 102, 103 R–103 Z
See application file for complete search history.

(56) References Cited

U.S. PATENT DOCUMENTS

| | | | |
|---|---|---|---|
| 7,080,119 B2 * | 7/2006 | Felt et al. ................. | 709/203 |
| 7,082,432 B2 * | 7/2006 | Bhogi et al. ................ | 707/10 |
| 7,188,111 B2 * | 3/2007 | Chen et al. ................. | 707/10 |
| 7,213,049 B2 * | 5/2007 | Felt et al. ................. | 709/203 |
| 2004/0215473 A1 * | 10/2004 | Bhogi et al. ................ | 705/1 |
| 2004/0216109 A1 * | 10/2004 | Bhogi et al. ............. | 718/101 |
| 2005/0144171 A1 * | 6/2005 | Robinson ..................... | 707/9 |
| 2005/0262077 A1 * | 11/2005 | Barnes et al. ................ | 707/8 |
| 2005/0289212 A1 * | 12/2005 | Tankov et al. ............ | 709/200 |
| 2006/0010026 A1 * | 1/2006 | Nenov et al. ............... | 705/10 |
| 2006/0031388 A1 * | 2/2006 | Tankov et al. ............ | 709/217 |

* cited by examiner

*Primary Examiner*—Cheryl Lewis
(74) *Attorney, Agent, or Firm*—Fliesler Meyer LLP

(57) ABSTRACT

The Java transaction API for use with global transaction can use a system using alias for the branch ID. The alias can allow multiple branch IDs for single resource.

16 Claims, 4 Drawing Sheets

METHOD AND ASSIGNMENT OF TRANSACTION BRANCHES BY RESOURCE NAME ALIASING

BACKGROUND OF INVENTION

The present invention relates to application servers that use the Java Transaction API (JTA) for global transactions for J2EE applications to ensure data consistency when updates are made to multiple resource managers in a global transaction.

The Java Transaction API (JTA) specification discusses how global transactions may be used in J2EE applications to ensure data consistency when updates are made to multiple resource managers within the context of a global transaction. The JTA specification defines the software interfaces and interactions between the Transaction Manager (TM) and the Resource Manager (RM) as defined in the OpenGroup XA Specification on which the JTA specification is based. In the distributed transaction processing (DTP) model, as defined in the XA specification, an application component accesses one or more resource managers (such as databases or message queuing systems) within a scope of a global transaction that is controlled by the transaction manager. Resource manager updates are associated with a global transaction identifier (Xid) that uniquely identifies the global transaction and includes a branch qualifier component to uniquely identify a resource participant. To provide the Atomicity, Consistency, Isolation, and Durability (ACID) properties, the transaction manager coordinates the resource managers participating in a transaction using the two-phase commit (2PC) protocol. This protocol utilizes and depends on the XA contract between the transaction manager and resource managers to ensure that all changes are either committed or rolled back, that all resource manager state transitions are valid and take place independent of other changes, and that the changes are persistent, even in the event of failure.

FIG. 1 is a diagram that illustrates an exemplary JTA system. The Java application 102 running on an application server 104 can use a transaction manager 106 to interface with the resource managers 108a, 108b and 108c. The resource managers 108a, 108b and 108c can interact with each of the resources for the global transaction. Multiple resources can be included in the global transaction and the JTA system can ensure that either all branches of the transaction are completed or all branches of the transaction are rolled back. In example of FIG. 1, the resources for the transaction include databases 110 and 112 and message queue server 114. Each of the resource managers 108a, 108b and 108c can be registered with the application server 104 as part of the global transaction.

Some transaction Manager implementations assign a consistent Xid branch qualifier for each branch of a transaction that is based on some configuration artifact for a particular resource manager. For instance, the branch qualifier can be derived from the name that was used to register the resource manager with the transaction manager. Because the JTA specification does not specify how a resource manager is registered with a transaction manager, fails to discuss branch qualifier assignment, and provides no API for a resource manager to specify a branch qualifier on enlistment, most transaction manager implementations exhibit similar behavior.

The primary reason for using a consistent branch qualifier is for the case where two or more application components access the same resource manager within a global transaction. If separate branch qualifiers were used for each component, the application may encounter a deadlock within the resource manager since locks are typically not shared across transaction branches.

Some applications require different resource manager contexts in order to specify such attributes as security credentials or isolation level that are pertinent to the application component. The J2EE 1.4 specification discusses such requirements and provides a resource deployment option for un-shareable connections. A resource configured with connection sharing disabled requires that the container provide a new connection for each component requesting a resource manager connection. In order for a transaction manager to assign a single branch qualifier across resource manager connections, the global transaction must be disassociated from all connections before associating another connection with the branch. This requirement may not be possible in environments where the container is unable to intercept application calls to the resource manager.

DETAILED DESCRIPTION OF THE PREFERRED EMBODIMENT

Global Transaction (TX) can contain information about an individual global transaction including Xid, server participants and resource participants.

Resource Descriptor (RD) ccan contain information abut a resource registered with the TM. It includes configuration name of resource that is used for Xid branch qualifier assignment. In one embodiment, one instance exists per resource.

Resource Info/Instance (RI) information about a transaction resource participant. This data structure can be part of the TX data structure.

One embodiment of the present invention provides a means of associating an alias for a registered resource with a transaction. One embodiment of the present invention is a method for enlisting a resource in an global transaction.

In one embodiment, an alias is received along with an indication of a resource. A resource participant data structure is created corresponding with the alias. The resource participant data structure referencing the resource. The resource participant data structure can be used as part of a separate branch of a global transaction. Multiple branches of a global transaction can use the resource.

The resource manager can invoke a method on the transaction object, which includes in its signature the alias and an indication of the resource. The invoked method can be an enlist resource method. The new resource participant data structure corresponding to the alias can become a part of the global transaction context. The resource alias can appear to be a distinct resource and be issued a distinct branch qualifier. The distinct branch qualifier can be based upon the alias. Validation can be performed to ensure the alias does not conflict with a name of a prior resource registration or with an alias for a different resource. The resource participant data structure can be a resource info object. The resource info object can point to a resource descriptor object. Other participant data structures with different branch ids can point to the same resource descriptor object. The alias information can be part of the persistent part of the transaction log.

One embodiment of the present invention includes associating an alias with the resource for the transaction. The alias being different from the name of the resource. The alias can be used to derive a branch ID for the transaction.

Figure 1:
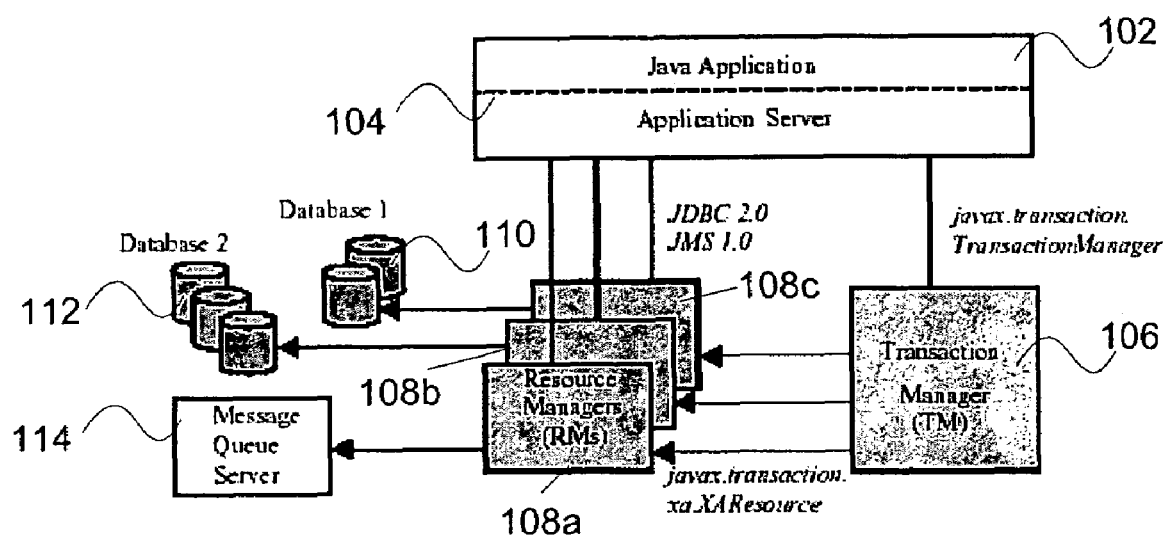
FIG. 1 illustrates a prior art JTA system.
Figure 2B:
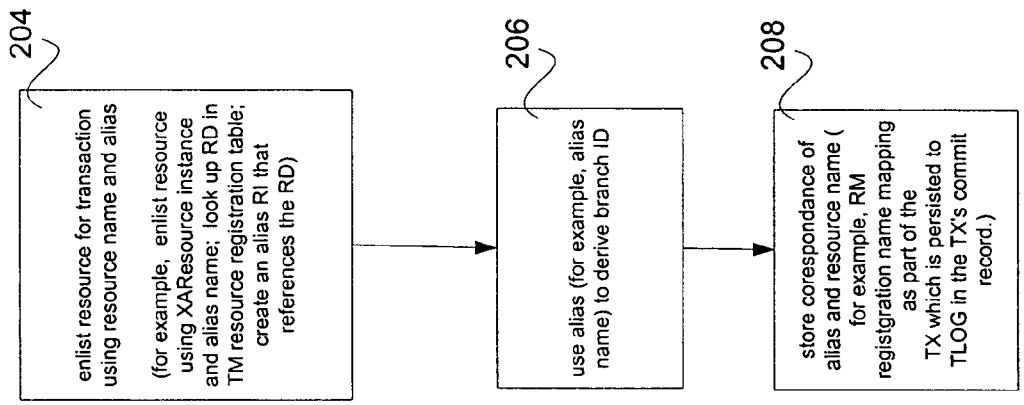
FIGS. 2A-2B illustrate methods of one embodiment of the present invention.
Figure 2A:
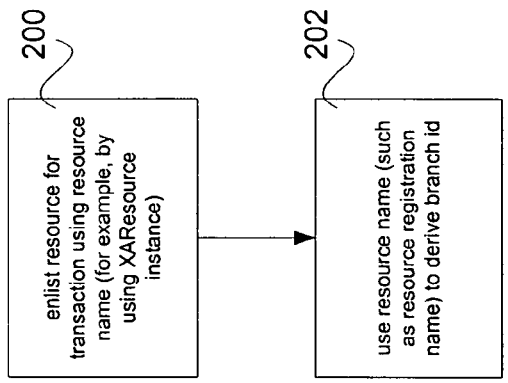

In the example of FIG. 2A, a resource is enlisted for a transaction using a resource name, in step 200. In step 202 this resource name is used to derive a branch ID.

In the example of FIG. 2B, the resource can be enlisted for a transaction using the resource name and an alias, in step 204. The alias can be used to figure out the branch ID, in step 206. Correspondence between the alias and resource name can be stored, in step 208, and from then on the branch ID derived from the alias can be used to designate a portion of the global transaction.

Figure 3A:
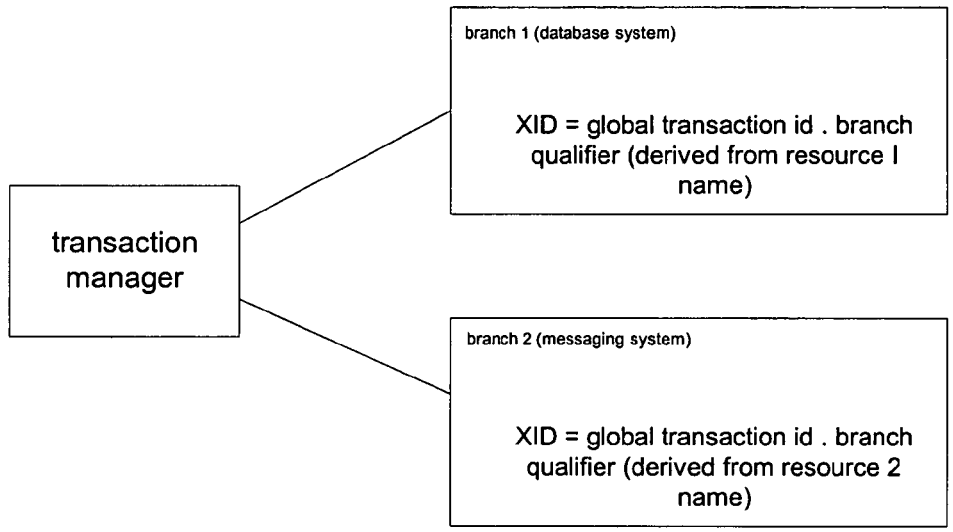
FIGS. 3A-3B illustrate the operation of the system of one embodiment of the present invention.
Figure 3B:
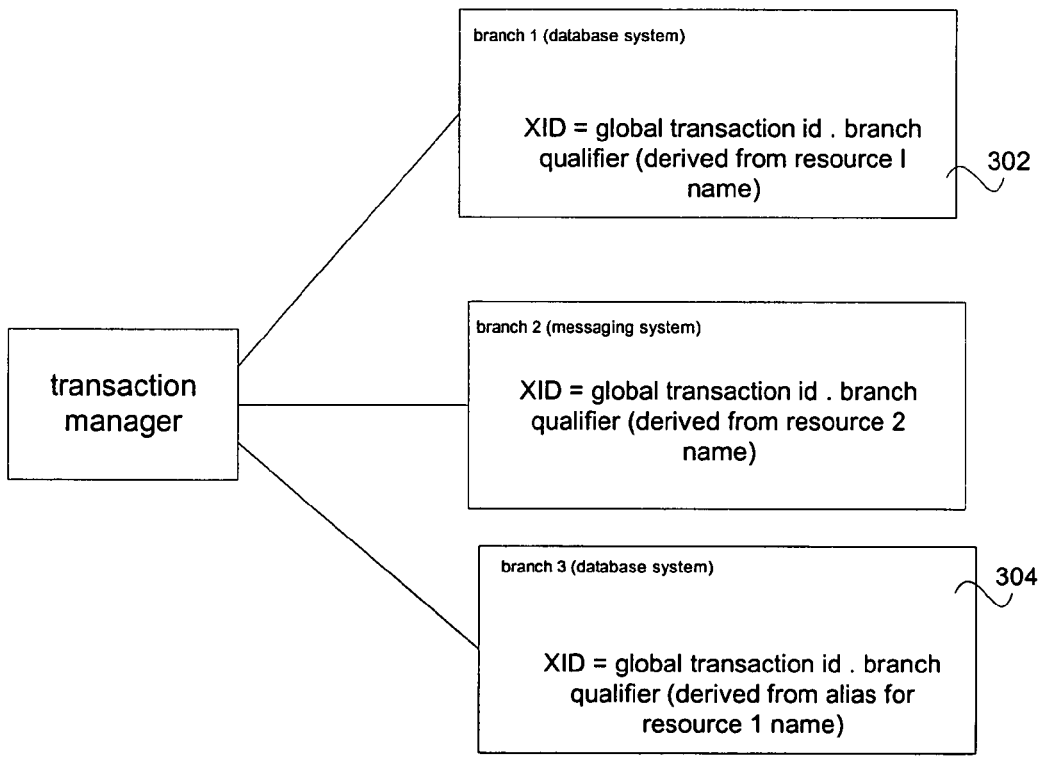

One mechanism for alias creation is for the resource manager to invoke a method on the Transaction object which includes in its signature a XAResource instance parameter and a name string parameter. The method signature can be as follows:

public void enlistResource(XAResource xares, String resourceNameAlias) throws RollbackException, IllegalStateException, SystemException;

FIGS. 3A and 3B illustrate the operation of the system of one embodiment. As shown in FIG. 3A, an Xid can be used to identify branches of specific transaction. The Xid can include a portion which is a global transaction ID as well as the branch qualifier. In the example of FIG. 3A, both of the branch qualifiers are derived from the names of the resources. FIG. 3B illustrates a situation in which resource I can be accessed with two different branch IDs. In this example, the first branch 302 of the transaction uses a branch qualifier derived from the resource I name. The second branch 304 has a branch qualifier derived from an alias for the resource I name. In this example, the same resource is accessed with two branches of the global transaction. This is not possible when the name of the branch qualifier of the Xid is uniquely derived from the resource name.

Figure 4:
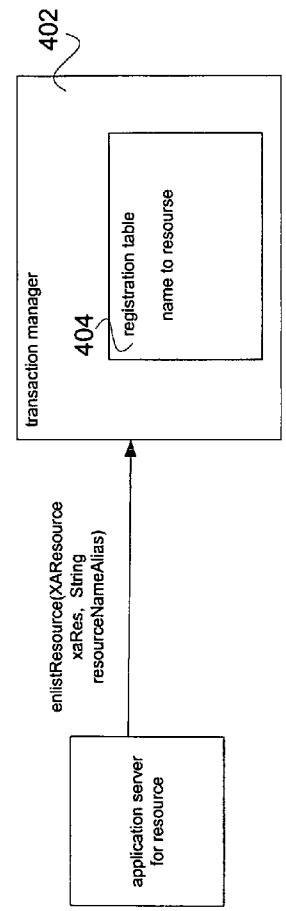
FIG. 4 illustrates a system of one embodiment of the present invention.

FIG. 4 illustrates an example in which the application server operating for the resource uses an enlistResource method including the resource name alias. The transaction manager 402 can store in a registration table 404 the correspondence of the alias name with the resource.

Figure 5:
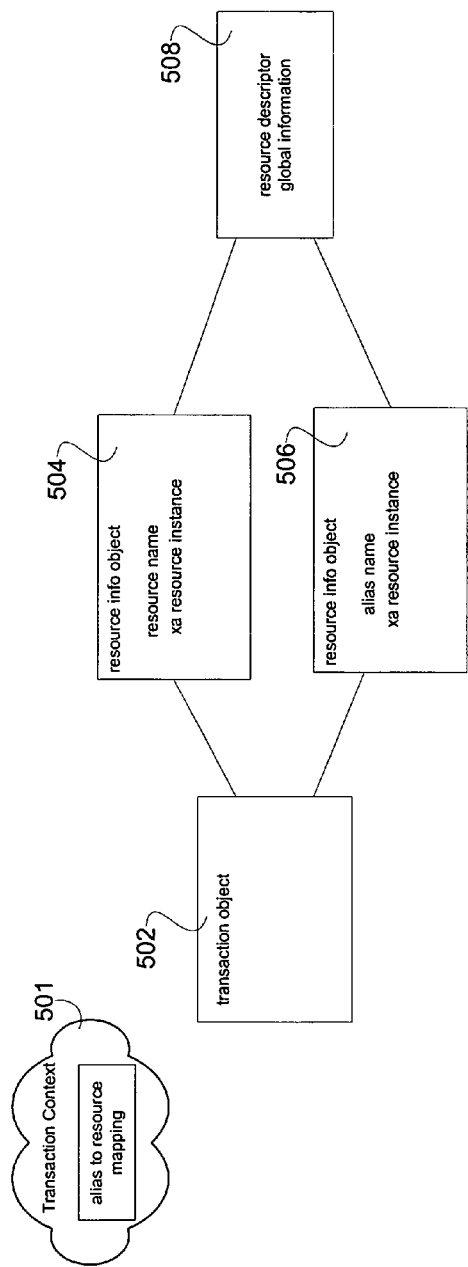
FIG. 5 illustrates a system of one embodiment of the present invention.

FIG. 5 shows an example of which the transaction object 504 for a transaction includes resource info objects 504 and 506. Typically, the resource info objects 504 and 506 will point to the resource descriptor 508 for the resource in the global transaction defined by transaction object 502. In this case, the resource info object 506 also points to the same resource descriptor 508. Transaction context 501 can store the alias to resource mapping.

The method signature can be semantically similar to the standard enlistResource method defined by the JTA specification. When invoked, the transaction can create a new resource participant data structure, such as resource info objects 506, under the name specified that references the registered resource identified by the XAResource argument. This alias becomes part of the global transaction context 501, and can be propagated between servers with the transaction context and is persisted to stable storage as part of the transaction log record. To the transaction manager, the resource alias can appear to be a distinct resource and will be issued a branch qualifier that is based on the name alias. When enlistment for a resource uses a name alias, validation can be performed to ensure that the alias name does not conflict with the name of a prior resource registration or with an alias for a different resource.

The alias mechanism can work in conjunction with the existing transaction manager implementation. When a resource is registered with the transaction manager, the transaction manager can add to a registration table a mapping of the XAResource instance and the resource name specified during registration. The registration table can be a mapping of XAResources to RD objects. The XAResource key can be defined by the set of XAResource instances for which the isSameRm method returns true. At this time a singleton resource descriptor (RD) object 508 can be created that encapsulates information about the resource. Because the JTA specification calls for the identification of resources by comparison of XAResource instances, using the isSameRM method, requests to enlist a resource in a transaction result in a registration table lookup to identify the particular resource being enlisted. A resource info (RI) object 504 can be created that references the resource descriptor singleton object 508 and the resource info object is associated with the transaction context to identify the resource participant.

When an alias enlistment request is made, a separate resource info object 506 can be created that references the resource manager 508 for the resource that matches the supplied XAResource instance, based on a registration table lookup. The alias resource info object has a name that differs from the associated resource descriptor name which indicates that the resource info object 506 is an alias for the registered resource. After creating the resource info object 506 for the alias, the transaction manager can invoke the start method on the XAResource object specified on the enlist request as is done normally by specifying an Xid with a branch qualifier derived from the alias name provided during the enlistment request.

However, the Xid object provided on the call to start can include a branch qualifier based on the alias name and not the registration name of the resource. All further XA operations on the resource alias can be performed with the alias branch qualifier. In order to facilitate proper recovery in the event of failure the alias information can be persisted as part of the transaction log (TLOG) commit record. During transaction manager initialization after restart, the committed transaction records can be read from the TLOG and the transaction contexts recreated. An alias to resource mapping can be persisted as part of the commit record so that the proper resource info alias may be reconstructed that references the correct resource descriptor singleton. After reconstructing the transaction object the transaction manager can continue commit processing on the resource participants specifying the correct alias branch qualifier the resource aliases.

As previously mentioned, one approach to enlistment of non-shareable connections is to specify the same branch qualifier for each connection accessed under the transaction context. This provides the benefit of avoiding resource manager deadlocks due to lock contention across transaction branches. However, using a single branch qualifier for multiple connections is only feasible when application calls into a particular connection can be intercepted to trigger enlistment/delistment. In situations where interception is not possible the container can perform the enlistment request with a resource name alias when the resource connection is obtained by the application.

Another potential advantage to using multiple branches is when several connections are accessed multiple times in the same thread of control. With the single branch approach, each resource manager enlistment must be delisted before a different connection may be enlisted. With the multiple branch approach, each connection may be enlisted once, accessed multiple times and finally delisted when the transaction completes thereby avoiding potentially expensive resource manager invocations.

An exemplary Java interface for an enlistResource method is described below.

Method weblogic.transaction.Transaction.enlistResource (XAResource, String)—Enlist the resource specified with the transaction associated with the target Transaction object. This method can enable the enlistment of multiple transaction branches for a given resource manager. Normally, JTA utilizes a single transaction branch for a resource manager that is derived from the name specified during resource registration. A transaction enlistment request for which a resource name alias is specified indicates to the transaction manager that a different branch qualifier is to be used when enlisting the specified resource. The scope of the alias is for the current transaction only. Knowledge of the alias-to-resource mapping is stored as part of the transaction context to facilitate proper recovery.

@param xares
   The XAResource object associated with the resource (connection).
@param resourceNameAlias
   The name that is used to derive the branch qualifier for this XAResource instance.
@return<i>true</i> if the resource was enlisted successfully; otherwise
<i>false<i>.
@throws RollbackException
   Thrown to indicate that the transaction has been marked for rollback only.
@throws IllegalStateException
   Thrown if the transaction in the target object is in the prepared state or the transaction is inactive.
@throws SystemException
   Thrown if the specified alias is the name of a registered resource or the name of an existing alias on the transaction or if the transaction manager encounters an unexpected error condition.
@exclude
public boolean enlistResource(javax.transaction.xa.XAResource xaRes, String resourceNameAlias)
   throws RollbackException, IllegalStateException, SystemException;

The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scopes of the invention are defined by the claims and their equivalents.

What is claimed is:

1. A computer based method comprising:
using a name of a resource to create a first branch ID for a first portion of a global transaction;
using an alias for the resource to create a second branch ID for a second portion of the global transaction, wherein the alias is an alternate name for the resource;
doing the global transaction using the first branch ID for the first portion of the global transaction and using the second branch ID for the second portion of the global transaction, wherein the first and second portion of the global transaction involve the resource;
wherein a resource manager invokes a method on a transaction object which includes in its signature the alias and the name; and
wherein creating a resource participant data structure corresponding to the alias, the resource participant data structure referencing the resource.

2. The method of claim 1, wherein the invoked method is an enlistResource method.

3. The method of claim 1, wherein the new resource participant data structure corresponding to the alias becomes part of a global transaction context.

4. The method of claim 1, wherein validation is performed to ensure that the alias does not conflict with the name of a prior resource registration or with an alias for a different resource.

5. The method of claim 1, wherein the resource participant data structure is a resource info object.

6. The method of claim 5, wherein the resource info object points to resource descriptor object.

7. The method of claim 1, wherein the alias is persisted as part of a transaction log.

8. The method of claim 1, wherein the resource participant data structure is used as part of the second portion of the global transaction.

9. A computer readable storage medium comprising code executed by a computer to:
use a name of a resource to create a first branch ID for a first portion of a global transaction;
use an alias for the resource to create a second branch ID for a second portion of the global transaction, wherein the alias is an alternate name for the resource;
do the global transaction using the first branch ID for the first portion of the global transaction and using the second branch ID for the second portion of the global transaction, wherein the first and second portion of the global transaction involve the resource;
wherein creating a resource participant data structure corresponding to the alias, the resource participant data structure referencing the resource; and
wherein a resource manager invokes a method on a transaction object which includes in its signature the alias and the name.

10. A computer readable storage medium of claim 9, wherein the resource participant data structure is used as part of the second portion of the global transaction.

11. A computer readable storage medium of claim 9, wherein the invoked method is an enlistResource method.

12. A computer readable storage medium of claim 9, wherein the new resource participant data structure corresponding to the alias becomes part of a global transaction context.

13. A computer readable storage medium of claim 9, wherein validation is performed to ensure that the alias does not conflict with the name of a prior resource registration or with an alias for a different resource.

14. A computer readable storage medium of claim 9, wherein the resource participant data structure is a resource info object.

15. A computer readable storage medium of claim 14, wherein the resource info object points to resource descriptor object.

16. A computer readable storage medium of claim 9, wherein the alias is persisted as part of a transaction log.

* * * * *

UNITED STATES PATENT AND TRADEMARK OFFICE
CERTIFICATE OF CORRECTION

PATENT NO. : 7,337,188 B2  Page 1 of 1
APPLICATION NO. : 11/247780
DATED : February 26, 2008
INVENTOR(S) : Somogyi et al.

It is certified that error appears in the above-identified patent and that said Letters Patent is hereby corrected as shown below:

In column 2, line 34, delete "ccan" and insert -- can --, therefor.

In column 2, line 44, before "global" delete "an" and insert -- a --, therefor.

In column 5, line 12, delete "xares" and insert -- xaRes --, therefor.

In column 5, line 21, delete "<i>false<i>." and insert -- <i>false</i>. --, therefor.

Signed and Sealed this

Twenty-third Day of March, 2010

David J. Kappos
*Director of the United States Patent and Trademark Office*